3,282,804
METHOD AND APPARATUS FOR ANALYZING METALS, ALLOYS AND SEMICONDUCTORS
Robert F. Stearn, Midland Road, P.O. Box 105, Pinehurst, N.C.
Filed Apr. 25, 1963, Ser. No. 275,617
11 Claims. (Cl. 204—1)

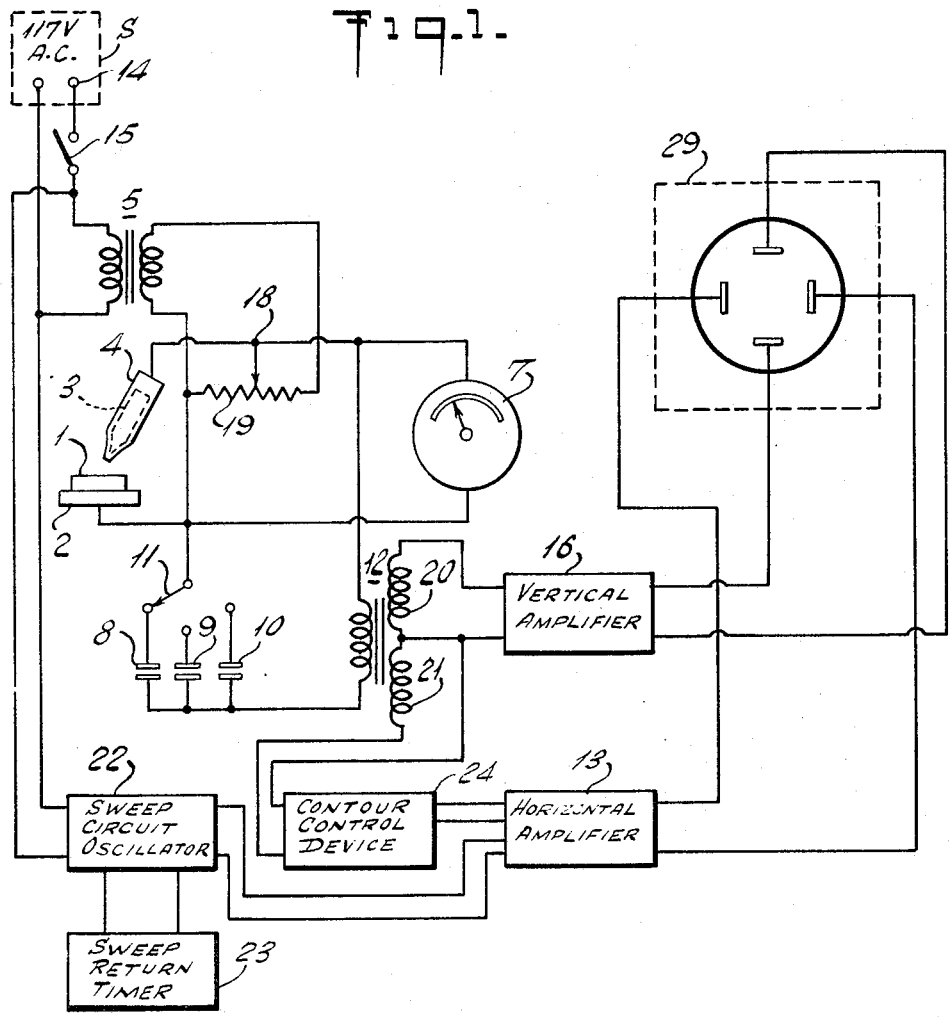
Fig. 1.
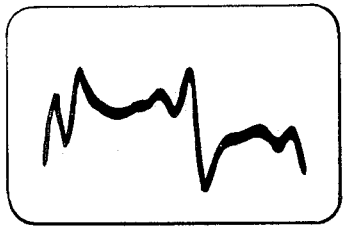
Fig. 2. HASTELLOY B
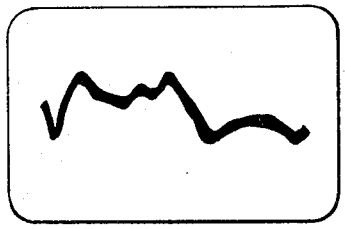
Fig. 3. NICKEL ALLOY
INVENTOR.
ROBERT F. STEARN
BY Meredith P. Sparks
ATTORNEY United States Patent Office 3,282,804
Patented Nov. 1, 1966

This application relates to an instrument and to a method for making analytical examinations of metallic specimens to determine their identification in relation to known compositions of any metals, alloys, semiconductors, and the like. By the use of my invention, as herein described, I am enabled to compare the composition of the specimen with that of known or related compositions of materials and to determine their similarities and/or differences. This I do with the least possible injury to the specimen itself. The examination and determination of alloy characteristics of the specimen is made in a matter of a few seconds usually. Such characteristics are graphically shown on an oscilloscope, or its equivalent. They may thus be photographed for a permanent record, if desired. Electrolytic processing of the tests is used preferably, as will be brought out in the full description hereinafter given.

A primary object of my invention is to disclose a preferred form of apparatus for making analytical examinations of the kind above referred to.

A secondary object is to define a novel method for making these analytical examinations.

Other objects and advantages to be achieved in carrying out my invention will become apparent to those who read the full description and claims of this specification which follows.

Reference is here made to my U.S. Patent 2,531,747 issued November 28, 1950, entitled "Metal Identifier." In that patent I showed how a specimen subjected to electrolytic detection methods would behave when a D.C. voltage was applied to a probe circuit and through the electrolyte.

According to my patent, as above cited, the identity of the metallic content of the test specimen was brought out during the period of electrolytic testing by observing variations of output voltage through the electrolytic cell. A galvanometer placed across the terminals of the electrolytic cell, but in circuit with a rheostat, gave the desired indications. These could then be compared with certain calibration curves that had been previously obtained in the same manner, using specimens of known alloy composition.

It will be apparent to those skilled in the art, that the patented technique of my invention was capable of further improvement. I have now discovered and will disclose in this application a new circuit and method wherein the test specimen, the electrolytic cell, and an oscilloscope instrument are suitably combined for utilization in an A.C. circuit arrangement. The use of D.C. voltages in the test cell tends to polarize the metal under test. Using A.C. voltage the stabilization of the curve tends to be hastened and the identification of metals which are more nearly alike is more precise. The graphic configurations of alloy characteristics have been found to be consistent, as between like specimens and corresponding periods of testing in the electrolytic circuit.

It will be noted with respect to the oscilloscope indications of the presently described invention, that each particular alloy tested has its own natural characteristics, like a fingerprint, for example. Such alloy compositions as would be generally serviceable in the industry can then be cataloged with their graphic charts as obtained from the oscilloscope pictures of the known metals, alloys, and other materials capable of like methods of testing.

Finger-printing for purpose of identification of people, and the making of oscilloscope graphs as herein described for metal and alloy identification, seem to me to offer the best explanation of how the instant disclosure teaches an entirely new concept of what can be accomplished when an electronic circuit powered by an alternating current source is used in combination with an electrolytic cell, an oscilloscope, and suitable coupling means for controlling the horizontal and vertical deflecting plates of said oscilloscope. My cited patent did not approach such results, using only the D.C. application of its power source to the electrolytic cell.

The formation of a film of corrosion products on the test specimen causes a decrease in alternating current flow through the cell. The time required to form this film from the start of the test until a stable curve is viewed on the scope is reduced to a minimum by the selection of suitable electrolytes and electrolyte concentrations. An extended time period, i.e., 1 minute or more is undesirable.

While the theory of operation of an invention does not need to be explained by the inventor, the following considerations are offered:

(A) A self-generating E.M.F. is produced due to the galvanic action of two dissimilar metals (the test probe and the alloy under test) in the electrolyte. This small E.M.F. adds to or subtracts from the D.C. increment produced under (C) below.

(B) A film forms on the surface of this alloy and thereby increases the total internal resistance of the cell. The electrolyte concentration and type is so chosen as to reduce to a minimum the length of time for this total cell resistance to build up, namely ½ to 20 seconds.

(C) The alternating current passing through the cell is in part rectified due to the film formed on the alloy under test. The remaining A.C. plus the small D.C. increment is passed through the circuit, the D.C. being used to saturate the core of the transformer and the A.C. to be thus altered by the core-saturated transformer and passed on to the vertical amplifier of the scope.

It should be well understood by those skilled in the art that I do not necessarily require such power sources as are shown in the drawing. For example, a motor generator might be used and this could have a voltage of say 117 volts feeding to a transformer which may supply much lower volts for the electrolytic cell. This motor generator would, of course, allow for variations of power supply other than that which is commercially provided.

A preferred embodiment of my invention will now be described in detail, reference being had to the accompanying drawing, wherein:

FIGURE 1 shows a circuit diagram for intercoupling the components of the invention. The circuit is adapted to display such configurations either with the use of rectilinear coordinates, or polar coordinates. The adaptation is provided with the aid of conventional switching means or intercouplings, transformers, reactive devices, etc. all as may be arranged by those skilled in the art.

FIGURE 2 shows, for example, one of many pictures to be brought out on the oscilloscope screen, when testing a given a given specimen of an alloy for its identification. In this case, it is the well-known nickel alloy Hastelloy B.

FIGURE 3 shows, for comparison, another picture, taken from the oscilloscope screen, wherein the specimen tested is a nickel alloy of different composition.

In FIGURE 1, I show a test specimen 1, resting upon the clean surface of a conductive base 2. A capillary holder portion 3, preferably formed within a probe 4, serves to carry out an electrolytic test of the specimen with a very small yet sufficient spread of the electrolyte over the specimen. Other designs of the probe 4, may, of course, be found preferable to the one shown, for a particular variety of specimen to be specificially examined for identification.

Preparation for test includes dipping the probe into a container which holds a suitable electrolyte solution. Then, with capillary action, enough of the solution is drawn up into the holder 3, expelling the air therefrom. Alternatively, a piece of filter paper saturated with the electrolyte, may be placed between the specimen under test and the probe. The probe member for holding a small quantity of electrolyte can be made of a conductive material such as metal or carbon, or it may be constructed of an insulating material with an internal electrode.

To continue with my description of the preferred circuit arrangement, I show power source outlet S having terminals 14 which serve conventionally to feed the entire circuit arrangement with A.C. voltage, say of 117 volts, using an on-off switch 15.

A step-down transformer 5 provides an A.C. voltage for electrolytic cell operation. The voltage range for this cell may extend between 1 volt and 100 volts A.C., according to the specific requirements of utilization found to be desirable.

The step-down transformer 5, at one output terminal, leads to a junction-point 18 for several further connections, one of them being to the probe 4, for application of A.C. voltage to the electrolytic cell. For regulation of the voltage drop across this cell a rheostat 19 may be used in parallel therewith. This voltage drop is measurable by means of an A.C. voltmeter 7.

The composite voltage across the electrolytic cell consists of an A.C. component and a D.C. component which is applied to a condenser-inductive circuit, the inductance being the primary of an iron-core transformer 12. The secondary of this transformer has a winding 20 coupled to the input circuit of a vertical deflecting-plate amplifier 16. There, the voltage is raised suitably, so as to impress itself as a graphic rectilinear configuration for vertical plate control in the oscilloscope 29. Thus, film-formation effects may be observed on the oscilloscope screen for identification of the alloy content of the specimen 1.

The above-described test of corrosion effects on the specimen 1 can thus be made during one or more intervals of horizontal deflecting circuit control in the sweep-circuit oscillator 22. The duration of the hold of the probe 4 against the specimen 1 may be for making the observation with repeated sweeps of a sweep-circuit oscillator 22, depending on the need for observing a drift in the nature of that observed configuration. A sweep-circuit return timer 23 conventionally controls the sweep-circuit oscillator 22. The simpler forms of my invention, the components 22 and 23 may be eliminated by direct control of the horizontal plate amplifier 13, which would then be coupled suitably for that control from the 117-volt source S. Obviously, without the use of a sweep-return timer 23, the timing of the oscillator 22 would depend on the 60 cycle frequency of the source S.

During the electrolytic testing of specimen 1 several conditions of a changing nature occur. The natural corrosion products from the alloy itself create an E.M.F. which varies according to the changing resistance of the film on the electrodes. A secondary reaction, not less important in itself than the initial one above mentioned, is the resistance of the cell to the flow of alternating current impressed on it. This resistance of the cell distorts the A.C. flow because of its rectification effects. It thus characterizes the pattern of the linear trace that is observed on the oscilloscope.

In one embodiment of my invention, I provided a sensitivity switch 11 for selecting a particular one of the condensers 8, 9 and 10 to be resonated with the inductance of the transformer 12. The design of this resonant circuit was one which successfully employed paper condensers having respective values of 10, 20 and 30 mfd. The primary-to-secondary turn ratio of the transformer 12, disregarding the auxiliary winding 21 and looking only at its secondary winding 20, can be varied over a high ratio range of 1 to 100 and a 1 to 1 ratio. This range, however, should not be construed as imposing any limitations on the scope of the invention itself, as regards the novelty thereof. This embodiment of my invention demonstrates the novel results that are obtained by the use of a composite voltage having both A.C. and D.C. components applied to the electrolytic cell circuit. Furthermore, in the capacitive component of the filter circuit, a charge appears to be built up which depends in value on the D.C. component in the circuit. The inductance of the transformer 12 resists the flow of the A.C., depending on the magnetic saturation of its iron core. All of these effects appear to contribute toward the increase in reliability of the herein disclosed metal identification method.

The graphic configurations of alloy identities, as shown on the oscilloscope 29 using the above described method, will be understood to be rectilinear. The A.C.-D.C. composite signal represents the variations of corrosive film formation when the specimen 1 is a electrolytically tested. Certain tests may well be carried along throughout any number of cycles of the sweep-circuit oscillator 22, although, in most cases, one, or very few cycles would be sufficient. But it will be apparent to those skilled in the art that it is advantageous for certain alloys to be tested under varying adjustments of the sweep-circuit oscillator 22. So the scanning action of the horizontal amplifier 13 is preferably made flexible, as above described. The oscilloscope graphs are made rectilinearly if the transformer winding 21 (the auxiliary portion of the secondary winding in transformer 12), is open-circuited. But if polar coordinates of graphic representation are desired, then the winding 21 should be used to spread the graphic configuration signal, that is, the A.C.-D.C. composite of corrosive film formation as control potentials for the horizontal plate amplifier 13 in the same manner as for the vertical amplifier 16. If equality of the potentials obtained as output from the two amplifiers 16 and 13 is desired, and assuming that the transformer windings 20 and 21 are equal, then there would be no need for a contour control device 24, such as herein shown. It is included, however, in the disclosure, simply for completeness thereof, and for possible designs of my apparatus where a greater range of its practical applications may be provided. For instead of forming a circular trace of the graphic pattern, an elliptical pattern might be desired. So the variable adjustment of the contour control device 24 would serve that purpose, all as will be well understood by those skilled in the art.

The filtering of input A.C. power may be just as much desirable in the operation of my invention as in the case of radio and TV voltage regulation. The feature of regulation is, therefore, well within the scope of those who would perfect my invention constructively.

Considering, now, the choice of electrolytes that may be used, I have found that various acids, bases, and salts of inorganic compounds may be selected with success. Certain concentrations of hydrochloric acid have been found to be useful. However, with aluminum alloys, a base, such as sodium hydroxide is preferable.

Test conditions including the use of electrolytes as described in my patent, U.S. 2,531,747, above cited, may be adopted with no unexpected results other than to provide greater breadth of variation in the distorted wave form of the configurations shown on the oscilloscope screen. In other words, alloys not separable for identification by the use of the invention described in my former patent may now be easily distinguished.

The graphs shown in FIGS. 2 and 3 were obtained while using an electrolyte of 25% HCl, and having the resistance 19 set to 100 ohms. The test time was arbitrarily limited to about 30 seconds.

The application of my disclosure as herein described is capable of much variation according to what might be required for appropriate identification of different metals, alloys, semi-conductors and the like. The novelty of the invention itself is, of course, determined by the scope of the claims which follow.

I claim:

1. An instrument for identifying metals comprising an electrolytic cell, one electrode of which is the unknown metal the other electrode being galvanically dissimilar from said electrode, means for applying an A.C. signal across said cell to cause alternating current electrolysis therein, thereby producing a composite A.C.-D.C. voltage output according to the character of the metal to be identified, an electric circuit means operable with said composite voltage for transforming it into a recognizable form, and means for displaying the resultant voltage as a waveform which identifies said metal.

2. An instrument for identifying metals comprising an electrolytic cell, one electrode of which is the unknown metal the other electrode being galvanically dissimilar from said electrode, means for applying an A.C. signal across said cell thereby producing a composite A.C.-D.C. voltage output according to the character of the metal to be identified, an electric circuit means operable with said composite voltage for removing the D.C. component therefrom, and means for displaying the resultant A.C. voltage as a distorted waveform which identifies said metal.

3. An instrument for identifying metals comprising an electrolytic cell, one electrode of which is the unknown metal the other electrode being galvanically dissimilar from said electrode, means for applying an A.C. signal across said cell thereby producing a composite A.C.-D.C. voltage output according to the character of the metal to be identified, electric circuit means including a capacitor and inductor operable with said composite voltage for removing the D.C. component therefrom, and an oscilloscope for displaying the resultant A.C. voltage as a waveform which identifies said metal.

4. An instrument for identifying metals comprising an electrolytic cell, one electrode of which is the unknown metal and the other is a test probe electrode which is galvanically dissimilar from said electrode, a piece of filter paper saturated with an electrolyte solution between said electrodes and in contact therewith, means for applying an A.C. signal across said cell of sufficient magnitude to cause an alternating current electrolysis in said cell, thereby producing a composite A.C.-D.C. voltage output according to the character of the metal to be identified, electric circuit means including a capacitor and inductor operable with said composite voltage for removing the D.C. component therefrom, and an oscilloscope for displaying the resultant A.C. voltage as a waveform which identifies said metal.

5. An instrument for identifying metals comprising an electrolytic cell, having galvanically dissimilar electrodes of which one is a specimen of a metal to be identified, means for applying an A.C. signal across said cell to cause alternating current electrolysis therein thereby producing a composite A.C.-D.C. voltage output according to the character of the metal to be identified, an oscilloscope, and a condenser and transformer in electrical circuit relationship with said cell and oscilloscope for removing the D.C. component therefrom, thereby producing a distorted waveform on said oscilloscope which identifies said metal.

6. An instrument for identifying the metallic characteristics of a given specimen to be tested comprising an electrolytic cell, one electrode of which is said specimen, the other electrode of which is galvanically dissimilar from said specimen, means including a probe circuit arrangement connected to and in combination with said cell for adjustably measuring and controlling the potentials that appear across said cell during the test, means for applying an alternating current potential across the electrodes of said cell, thereby to produce alternating current electrolysis therein, means for manifesting the effects of corrosion which occur on the skin of the specimen under test, and oscilloscope means for observing variations of potential which result from that corrosive film formation on the skin of the specimen itself.

7. An instrument for testing a given specimen analytically in relation to a second specimen, the composition of which is known and galvanically dissimilar from that of the given specimen, said instrument comprising an electrolytic cell having as one of its electrodes said given specimen, a probe circuit arrangement and a holder for electrolyte in said cell, said arrangement comprising the other of the electrodes of said cell, an alternating current source of suitable value connected across said electrodes to provide electrolysis in said cell, said probe circuit arrangement including resonant circuit means whereby rectification products of the electrolytic action is obtained in said cell, thereby to develop a composite of A.C.-D.C. output potentials, this probe circuit arrangement being characterized as one which manifests variations of corrosive action as it occurs in forming a film on the surface of said given specimen while under test; an oscilloscope means operably associated with said probe circuit arrangement and having a scanning means coupled to its input circuitry, and means for causing a graphic wave formation on the screen of said oscilloscope thereby to picture that manifestation.

8. The invention of claim 7 wherein the scanning means is a linear scanning means.

9. The invention of claim 7 wherein said scanning means is a polar scanning means.

10. The invention of claim 7, further characterized in that the probe circuit arrangement includes an alternating current voltmeter for observing the value of input potentials applied to said probe circuit arrangement.

11. A method for making analytical examinations of compositions of matter having the characteristics of metals, alloys and semi-conductors, comprising applying an alternate current action across two galvanically dissimilar electrodes bridged by an electrolyte, one of which is the unknown specimen, to produce corrosive effects on the skin of said specimen, and manifesting the said effects graphically with an oscilloscope.

References Cited by the Examiner

UNITED STATES PATENTS 2,531,747  11/1950  Stearn _____ 204—195

JOHN H. MACK, *Primary Examiner.*

T. TUNG, *Assistant Examiner.*